Nov. 15, 1927.
A. C. HAYDEN
1,649,470
FILM REEL
Filed Nov. 13, 1926
2 Sheets-Sheet 1
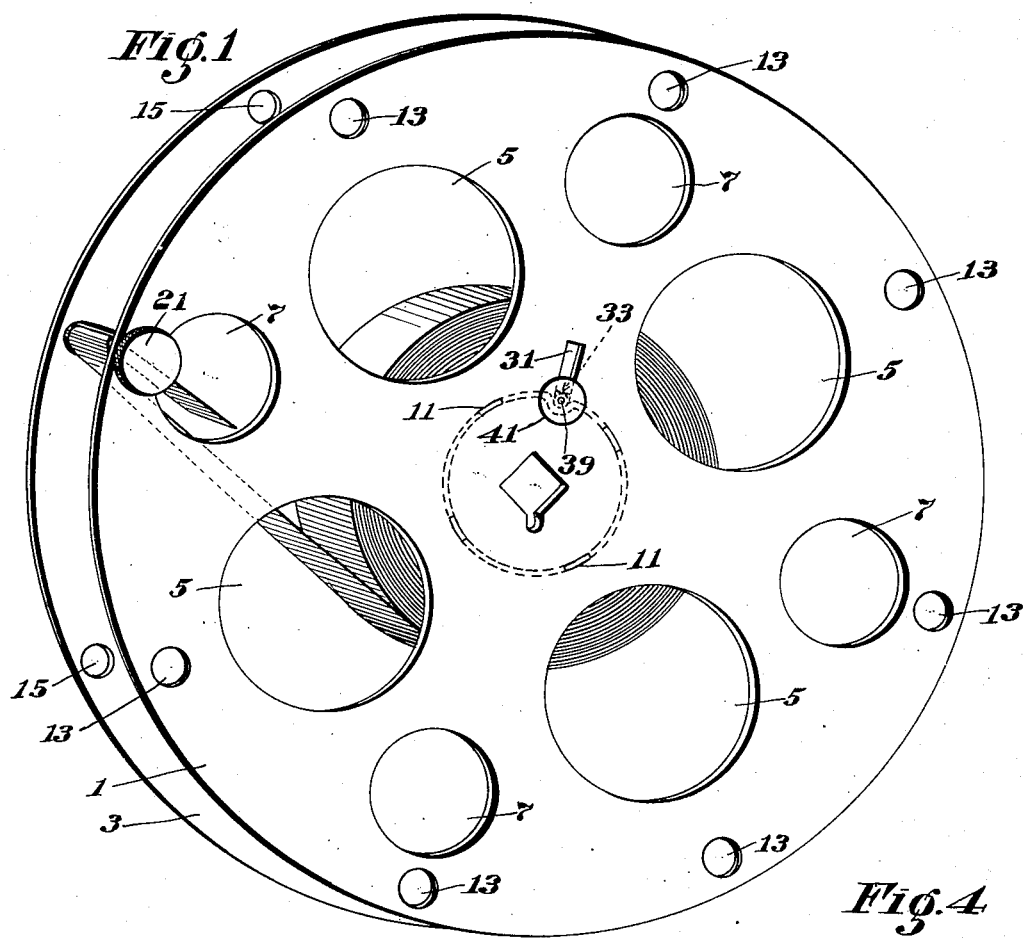
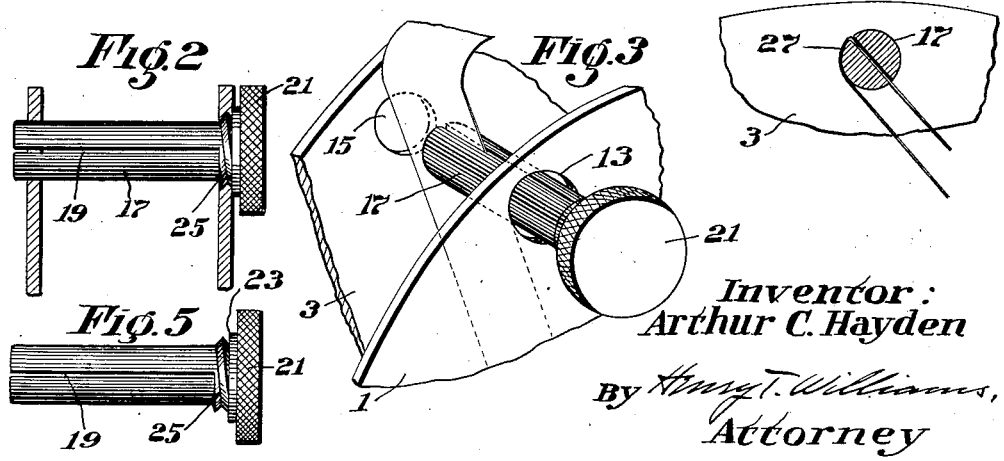
Inventor:
Arthur C. Hayden
By Henry T. Williams,
Attorney Nov. 15, 1927.
A. C. HAYDEN
1,649,470
FILM REEL
Filed Nov. 13, 1926
2 Sheets-Sheet 2
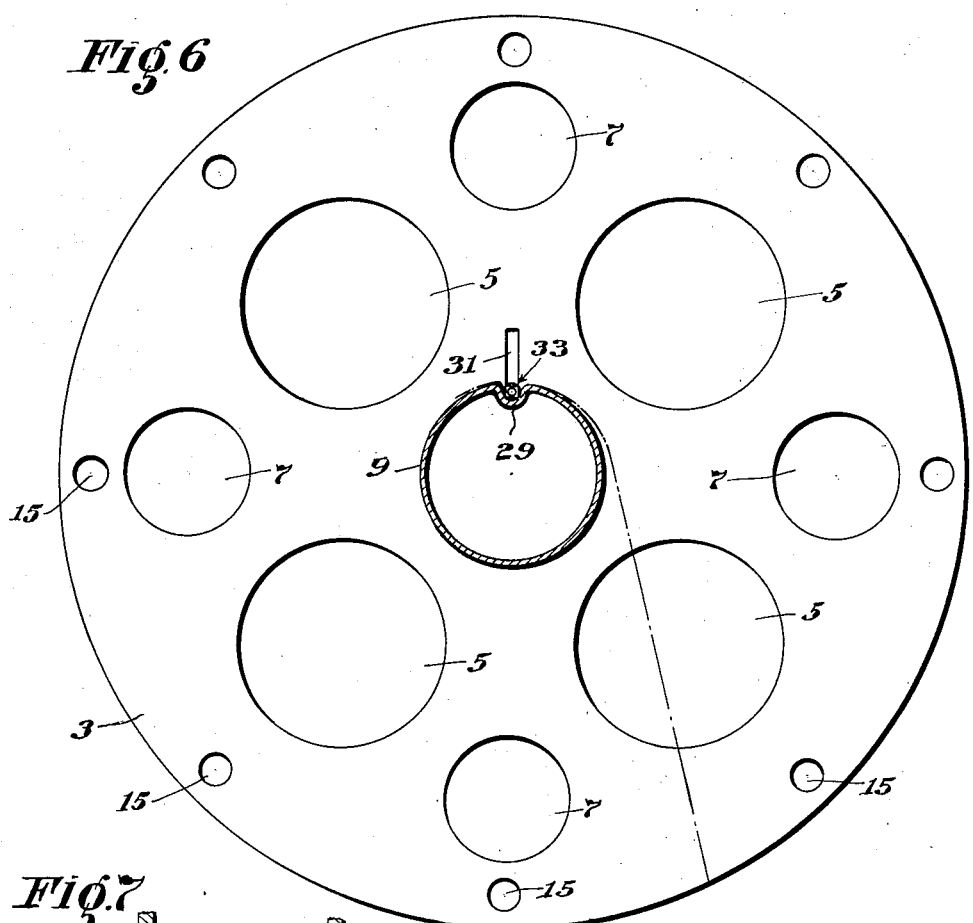
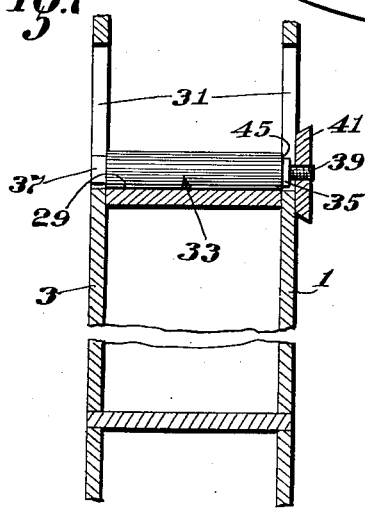
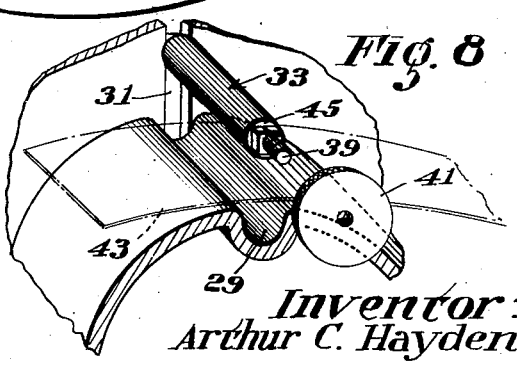
Inventor:
Arthur C. Hayden
By Henry T. Williams,
Attorney Patented Nov. 15, 1927.

1,649,470

UNITED STATES PATENT OFFICE.

ARTHUR C. HAYDEN, OF BROCKTON, MASSACHUSETTS.

FILM REEL.

Application filed November 13, 1926. Serial No. 148,223.

The invention to be hereinafter described relates to film reels for motion picture apparatus.

Heretofore, considerable inconvenience has been experienced by the lack of suitable means for securing the free end of the film to the reel when the latter is not in use. The film has a springy character which tends to cause the outer convolutions of the film wound around the hub to spring outward so that the free end thereof will project beyond the periphery of the reel with consequent liability of injury thereto. Therefore, one of the purposes of the present invention is to provide simple and efficient means for securing the free end of the film to the reel.

Another purpose of the invention is to provide simple and efficient means for securing the inner end portion of the film to the hub of the reel.

The character of the invention may be best understood by reference to the following description of an embodiment thereof shown in the accompanying drawings, wherein:

Fig. 1 is a perspective view of a film reel embodying the invention;

Fig. 2 on an enlarged scale is a sectional detail of portions of the side plates of the reel and the film locking pin cooperating therewith;

Fig. 3 is a perspective view of portions of the side plates of the reel and showing the manner of presenting the pin to the film;

Fig. 4 is a detail view showing the position of the pin after it has been turned to secure the pin to the reel;

Fig. 5 is a side view of the pin;

Fig. 6 is a section through the hub of the reel and showing the groove and key for securing the inner end portion of the film to the hub;

Fig. 7 on an enlarged scale is a section through the hub and portions of the side plate and showing the key in locking position; and Fig. 8 is a perspective view showing the manner of presenting the key to the groove to lock the film therebetween.

The reel shown herein as one good embodiment of the invention comprises a pair of circular plates 1 and 3 having large apertures 5 and smaller apertures 7 therein. Between and secured to the plates is a cylindrical hub 9 conveniently formed of sheet metal and having lugs 11 (Fig. 1) projecting from the ends of the hub into corresponding holes in the plates, the ends of said lugs being upset to secure the plates to the hub.

The plate 1 has a series of threaded holes 13 (Fig. 1) therein, and the plate 3 has a series of smooth holes 15 therein registering with the threaded holes.

A pin 17 is adapted to be inserted in any pair of the registering holes. This pin has a slot 19 therein extending from one end of the pin toward but terminating somewhat short from the opposite end of the pin. At one end of the pin is a head 21 and between the slot and the head is a circumferential shoulder 23. The portion of the pin between the shoulder and the adjacent end of the slot is threaded, and in the present instance is in the form of a single thread 25 which extends about three-fourths of one complete convolution.

In use, the free end of the film is grasped and held in registration with the pair of the holes nearest thereto, and the pin is inserted through the threaded hole as illustrated in Fig. 3 so as to receive the film. The pin is inserted through the smooth hole registering with the threaded hole, and then the head 21 is turned thereby causing the thread 25 to screw into the threaded hole in the plate. The pin is turned until the circumferential shoulder 23 presses tightly against the outer face of the plate, thereby to secure the pin against film releasing rotative movement. When the thread on the pin is screwed into the plate, the pin will rotate to a position, such for example, as is shown in Fig. 4, and will form a bight 27 in the film which will prevent the free end of the film from slipping out from the slot in the pin. In securing the film, it may be drawn through the slot to such an extent that the locking rotative adjustment of the pin will tension the portion of the film standing between the outermost film convolution and the pin.

Referring more particularly to Figs. 6, 7 and 8, the means for securing the inner end portion of the film to the hub will now be described. This means, in the present instance, comprises a groove 29 formed in the hub, and at the opposite ends of the groove are a pair of slots 31. A key 33 has a cylindrical portion extending between the inner faces of the plates. At the opposite ends of the key are squared portions 35 and 37 which enter the slots and prevent rotative movement of the key. The squared portion 35 has a thickness somewhat less than the thickness of the plate in which it projects. A threaded stud 39 extends from the squared portion 35 and somewhat beyond the face of the plate adjacent thereto, and a hand nut 41 is screwed onto the stud.

In use, the inner end portion 43 (Fig. 8) of the film is inserted between the groove 29 and the key 33, and then the key is thrust along the guide slots 31 into the groove. Then the hand nut is tightened thereby to cause the shoulder 45 and the nut to grip a portion of one of the plates between them and prevent the key from moving outward from the groove. Since the squared portion 35 of the key has a thickness less than the plate, it will not interfere with the gripping of the latter between the shoulder and the nut.

By my invention, simple, cheap devices are provided for securing the inner and outer ends of the film to the reel.

It will be understood that the invention is not limited to the specific embodiment shown, and that various deviations may be made therefrom without departing from the spirit and scope of the appended claims.

What is claimed is:

1. A film reel comprising a pair of plates, a hub between said plates adapted to have a film wound thereon, one of said plates having a threaded hole and the other of said plates having a smooth hole registering with the threaded hole; and a pin in said holes for securing the outer free end of the film to the reel and having a slot for receiving the film, a head and a thread on the pin adapted to be screwed into the threaded hole and turned to prevent the film from slipping through the pin slot.

2. A film reel comprising a pair of plates having registering holes therein, one of said holes being threaded and a hub between said plates adapted to have a film wound thereon; and a pin having a slot therein for receiving the free end of the film, a thread on the pin extending a part of a convolution and a portion at an end of the thread adapted to press against the plate having the threaded hole to prevent the pin from unscrewing from the hole.

3. A device for securing a film to a reel comprising a pin having a slot adapted to receive the film and a thread on the pin extending a part of a convolution and adapted to be screwed into a hole in the reel and secure the pin to the reel.

4. A device for securing a film to a reel comprising a pin having a slot adapted to receive the film, and a thread on the pin adapted to be screwed into a threaded hole in the reel, said pin having a portion at an end of the thread adapted to press against a part of the reel to secure the pin to the reel.

5. A film reel comprising a pair of plates, a hub between and secured to said plates and adapted to have a film wound thereon, said hub having a groove therein and said plates having a pair of slots communicating with said groove, a key movable in said slots toward and from said groove and adapted to confine an end portion of the film in said groove, and a nut on the key adapted to press against the outer surface of one of the plates to lock the key in the groove.

ARTHUR C. HAYDEN